United States Patent
Lee et al.

(10) Patent No.: US 10,511,595 B2
(45) Date of Patent: Dec. 17, 2019

(54) STAMPER, TERMINAL, AND METHOD FOR OPERATING THE SAME

(71) Applicant: SK TELECOM CO., LTD., Seoul (KR)

(72) Inventors: Sun Ho Lee, Seoul (KR); Soo Woong Woo, Seoul (KR); Jae Hun Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 106 days.

(21) Appl. No.: 15/352,286

(22) Filed: Nov. 15, 2016

(65) Prior Publication Data

US 2017/0063849 A1 Mar. 2, 2017

Related U.S. Application Data

(63) Continuation of application No. PCT/KR2015/004575, filed on May 7, 2015.

(30) Foreign Application Priority Data

May 15, 2014 (KR) .................. 10-2014-0058503

(51) Int. Cl.
*H04L 29/06* (2006.01)
*G06Q 30/02* (2012.01)

(52) U.S. Cl.
CPC ..... *H04L 63/0853* (2013.01); *G06Q 30/0236* (2013.01)

(58) Field of Classification Search
CPC ............ H04L 63/0853; G06Q 30/0236; G06F 3/0488; G06F 3/033; H04W 12/06
See application file for complete search history.

(56) References Cited

U.S. PATENT DOCUMENTS

| | | | | |
|---|---|---|---|---|
| 9,495,536 | B2 * | 11/2016 | Eom | G06F 21/35 |
| 2014/0070950 | A1 * | 3/2014 | Snodgrass | G08B 21/245 |
| | | | | 340/573.5 |
| 2014/0368430 | A1 * | 12/2014 | Choi | G06F 3/0488 |
| | | | | 345/156 |
| 2015/0293622 | A1 * | 10/2015 | Han | H04W 12/06 |
| | | | | 345/174 |
| 2017/0061464 | A1 * | 3/2017 | Lee | G06F 21/30 |

FOREIGN PATENT DOCUMENTS

| | | | | |
|---|---|---|---|---|
| JP | 2016031662 | A * | 3/2016 | |
| KR | 10-2013-0026610 | A | 3/2013 | |
| KR | 10-2013-0081560 | A | 7/2013 | |
| KR | 10-1281998 | B1 | 7/2013 | |
| KR | 10-2013-0100834 | A | 9/2013 | |
| KR | 20160036733 | A * | 4/2016 | |
| WO | 2013105788 | A1 | 7/2013 | |

OTHER PUBLICATIONS

International Search Report dated May 29, 2015 corresponding to International Application No. PCT/KR2015/004575.
China Office Action dated Mar. 27, 2019, in connection with the China Patent Application No. 201580025601.0.

* cited by examiner

*Primary Examiner* — Michael R Vaughan
(74) *Attorney, Agent, or Firm* — Hauptman Ham, LLP

(57) ABSTRACT

Disclosed are a stamper, a terminal and an operation method thereof. In performing stamp saving related to a store for a user by utilizing an electronic stamp and an application installed in the terminal, by limiting an irradiation angle of a beacon signal irradiated from the stamper and additionally applying authentication information, it is possible to prevent malicious and illegal use of stamps.

7 Claims, 8 Drawing Sheets

Fig. 3
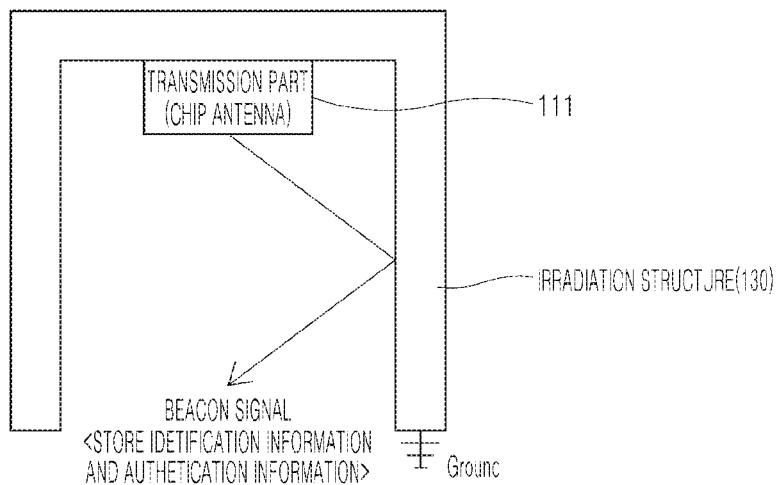
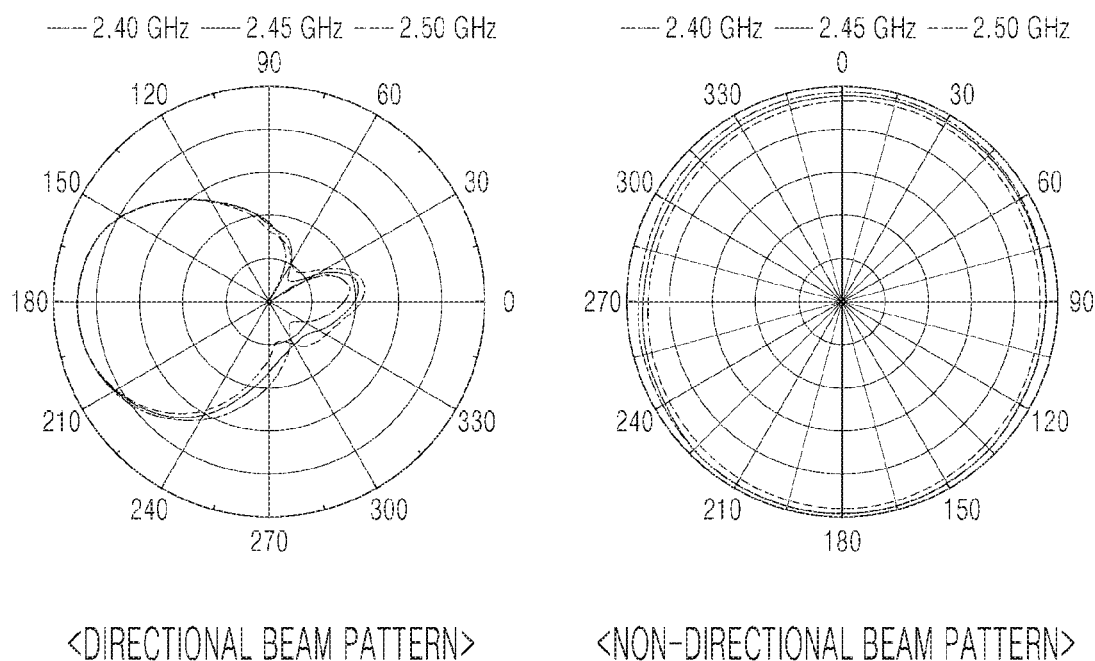
<DIRECTIONAL BEAM PATTERN> <NON-DIRECTIONAL BEAM PATTERN>

STAMPER, TERMINAL, AND METHOD FOR OPERATING THE SAME

CROSS-REFERENCE TO RELATED APPLICATIONS

This application is a continuation of International Application No. PCT/KR2015/004575, filed on May 7, 2015, which claims priority to Korean Patent Application No. 10-2014-0058503, filed on May 15, 2014, the entire contents of which are incorporated herein by reference.

TECHNICAL FIELD

This invention relates to a technique for saving stamps related to a store for a user by utilizing an electronic stamp and an application installed in a terminal.

BACKGROUND ART

Some store owners often offer a stamp service as a part of loyalty program for encouraging consumers to have more visits to and place more orders in their franchisees.

A stamp service refers to a service in which the number of times of visits of a user to a store or the number of times of orders by the user in the store is accumulatively marked with an ink stamp on a saving card in paper form and monetary or material benefits are offered to the user based on a result of the accumulation.

By the way, in order to save the number of times of visits to the store or the number of times of orders in the store with the ink stamp, the user who possessed a saving card given out by the store has to submit the saving card to the store. However, the paper saving card is inconvenient for the user and has a risk of missing.

Therefore, in order to overcome the above problems of the conventional stamp service, there is a need for replacements for the existing paper saving card and ink stamp.

DISCLOSURE

Technical Problem

In view of the above circumstances, s therefore an object of the present invention to provide a technique for saving stamps related to a store for a user by utilizing an electronic stamp and an application installed in a terminal, thereby preventing malicious and illegal use of the stamps.

Technical Solution

To achieve the e above object, according to a first aspect, there is provided a stamper including: a transmission part configured to transmit a beacon signal containing authentication information to a terminal; a plurality of contact ports contacting the terminal; a contact part configured to provide a pattern of the contact ports with the terminal when the contact ports contact the terminal; and an irradiation structure configured to transmit the beacon signal, which is irradiated from the transmission part, to the terminal at a preset irradiation angle.

In one embodiment, the pattern of the contact ports is set by activating at least one of contact ports according to preset pattern information.

In one embodiment, the preset pattern information is transmitted from the server.

In one embodiment, the irradiation structure is a shielding structure with one side opened and is formed to surround the transmission part in such a manner that the beacon signal irradiated from the transmission part is transmitted to the terminal through the opened one side at the preset irradiation angle.

In one embodiment, the transmission part transmits the beacon signal containing store identification information in addition to the authentication information to the terminal.

According to a second aspect, there is provided a terminal including: a receiving part configured to receive a beacon signal containing authentication information from a stamper; a recognizing part configured to recognize a pattern of contact ports included in the stamper when the contact ports are contacted; and a transmitting part configured to transmit the beacon signal to a server for stamp saying based on the authentication information when the pattern of the contact ports matches preset pattern information.

In one embodiment, the transmitting part transmits the beacon signal to the server when the pattern of contact ports including at least one of the number, position and interval of contact ports activated in the stamper matches the preset pattern information.

In one embodiment, the receiving part receives the beacon signal containing store identification information in addition to the authentication information from the stamper.

According to a third aspect, there is provided a method for operating a terminal including: receiving a beacon signal containing authentication information from a stamper; recognizing a pattern of contact ports included in the stamper when the contact ports are contacted; and transmitting the authentication information to a server for stamp saving when the pattern of the contact ports matches preset pattern information.

In one embodiment, the step of receiving the beacon signal comprises receiving the beacon signal containing store identification information in addition to the authentication information from a stamper.

Advantageous Effects

As described above, according to a stamper and a terminal for stamp service system according to one embodiment of the present invention, it is possible to perform the stamp saving related to a store for a user by utilizing an electronic stamp and an application installed in the terminal, and by limiting an irradiation angle of a beacon signal irradiated from the stamper and additionally applying authentication information, it is possible to prevent malicious and illegal use of stamps.

DESCRIPTION OF DRAWINGS

FIGS. 3 to 5 are schematic views for explaining a hardware structure of the stamp according to one embodiment of the present invention.

MODE FOR INVENTION

Hereinafter, an exemplary embodiment of the present invention will be described in detail with reference to the accompanying drawings.

Figure 1:
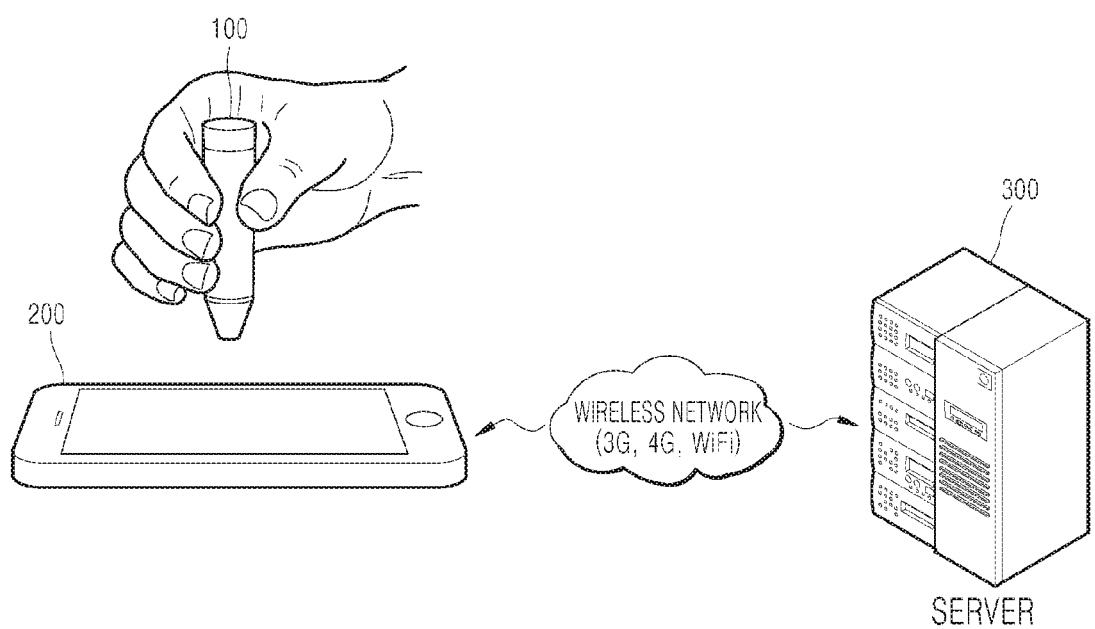
FIG. 1 is a schematic view illustrating the configuration of a stamp service system according to one embodiment of the present invention.

FIG. 1 is a schematic view illustrating the configuration of a stamp service system according to one embodiment of the present invention.

Referring to FIG. 1, a stamp service system according to one embodiment of the present invention includes a terminal 200 for managing a saving card, a stamper 100 for inputting an electronic stamp to the terminal 200, and a server 300 for managing authentication on stamp saving and the current situation on stamp saving for each store.

The stamper 100 refers to a device for facilitating stamp saying by inputting an electronic stamp to the terminal 200.

Apart from the input of the electronic stamp, the stamper 100 may radiate a beacon signal using, e.g., Bluetooth, to deliver store-related information (store identification information) to the terminal 200, thereby allowing the terminal 200 to perform stamp saving related to the store upon receiving the beacon signal.

The Bluetooth used herein may be, e.g., a BLE (Bluetooth Low Energy) method which is a low energy method in Bluetooth v4.0.

The terminal 200 is a device for managing a saving card with saved stamps using an application. Upon receiving the beacon signal delivered from the stamper 100, the terminal 200 performs the saving of stamps input from the stamper 100.

The terminal 200 may include, but is not limited to, a smartphone, a tablet PC, a PDA, or any devices capable of executing an application related to a stamp service and supporting Bluetooth.

The server 300 is a service server which performs the stamp saving requested by the terminal 200. The server 300 can perform and manage the stamp saving related to a store for a user only if authentication required for the stamp saving has been completed.

In one embodiment of the present invention, the stamper 100 inputs an electronic stamp to the terminal 200 and radiates a beacon signal using, e.g., Bluetooth, to deliver store-related information to the terminal 200, apart from the input of the electronic stamp.

In typical, the beacon signal irradiated from the stamper 100 has a non-directional beam pattern in which an irradiation angle of the beacon signal is not limited.

That the beacon signal irradiated from the stamper 100 has the non-directional beam pattern means that there is a high possibility that the beacon signal irradiated from the stamper 100 is received in other terminals, in addition to the terminal 200 in which the stamp saving is substantially performed.

In the end, if the beacon signal is received in other terminals, in addition to the terminal 200 in which the stamp saving is substantially performed, there may be a possibility of malicious use of stamps in the other terminals. Therefore, there is a need for measures against this malicious use.

One embodiment of the present invention suggests a technique for preventing malicious and illegal use of stamps in performing the saving of electronic stamps. Hereinafter, a stamp service system for implementing this technique will be described in detail.

The stamper 100 performs the function to irradiate a beacon signal.

In more detail, the stamper 100 uses the beacon signal aimed at a terminal 200 located in a store to deliver store identification information and authentication information to the terminal 200.

At this time, the stamper 100 irradiates the beacon signal with a directional beam pattern in which an irradiation angle of the beacon signal is limited to be smaller than a preset irradiation angle.

Such irradiation of the beacon signal having the directional beam pattern is to minimize a possibility that the beacon signal is received in terminals other than the terminal 200 in which stamping saving is actually performed, by limiting the irradiation angle of the beacon signal.

In addition, the stamper 100 performs the function to contact the terminal 200.

In more detail, the stamper 100 causes a pattern of contact ports 122 contacting the terminal 200 to be recognized by the terminal 200 so that the terminal 200 recognizing the pattern of contact ports 122 can deliver the store identification information and authentication information contained in the beacon signal to the server 300 which then can perform stamp saving related to the store.

At this time, the stamper 100 uses a multi-touch method supported by the terminal 200 to cause the pattern of contact ports 122 to be recognized by the terminal 200. This can be achieved by contacting a contact tip 121 including the contact ports 122 to a screen of the terminal 200.

The terminal 200 performs the function to receive the beacon signal.

In more detail, the terminal 200 receives the store identification information and authentication information delivered using the beacon signal from the stamper 100 in the store.

At this time, since the beacon signal irradiated from the stamper 100 has a directional beam pattern in which an irradiation angle of the beacon signal is greatly limited, the beacon signal irradiated from the stamper 100 can be received only in a limited range.

Such receiving the beacon signal irradiated from the stamper 100 only in the limited range is to minimize a possibility that the beacon signal may be received in other terminals in which stamp saving is not substantially performed.

The terminal 200 performs the function to recognize a pattern of contact ports 122 in the stamper 100.

In more detail, the terminal 200 recognizes the pattern of contact ports 122 from the contact tip 121 of the stamper 100 contacting the screen of the terminal 200. Upon recognizing the pattern of contact ports 122, the terminal 200 delivers the store identification information and authentication information received from the stamper 100 to the server 300 in which the stamp saying is performed.

At this time, the terminal 200 checks whether or not identification information of a saving card being executed in an application matches the store identification information delivered from the stamper 100 and whether or not the recognized pattern of contact ports matches preset pattern information. Thereafter, only when it is checked that both match with each other, the terminal 200 can transmit the store identification information and authentication information to the server 300.

The server 300 performs the function to save stamps.

In more detail, upon receiving the store identification information and authentication information, along with a stamp saving request, from the terminal 200, the server 300 performs an authentication procedure required for stamp saving and then saves stamps related to the store for a user.

At this time, the server 300 can perform the authentication procedure by checking the store in which the stamp saving need to be performed, based on the store identification information, and checking whether or not the authentication information delivered along with the store identification information matches authentication information issued in the store.

To this end, the server 300 separately manages authentication information generated in the store every time zone. Thus, upon receiving the authentication information from the terminal 200, the server 300 can check whether or not the received authentication information matches the separately managed authentication information.

In saving the stamps, the server 300 may additionally receive user identification information from the terminal 200, in addition to the above-mentioned store identification information and authentication information. Upon receiving the user identification information, the server 300 identifies a user for which stamp saving is requested, based on the user identification information, and then performs stamp saving related to the store for the user.

Here, a result of the stamp saving performed in the server 300 is returned from the server 300 to the terminal 200 in which the result of the stamp saving can be displayed on the screen of the terminal 200.

The current situations of stamp saving for each user performed in the server 300 may be integrated and managed for each store. In this case, it is to be understood that each store can inquire and check the current situations of stamp saving for each user being managed in the store from the server 300.

Hereinafter, the configuration of the stamper 100 according to one embodiment of the present invention will be described in more detail with reference to FIG. 2.

Figure 2:
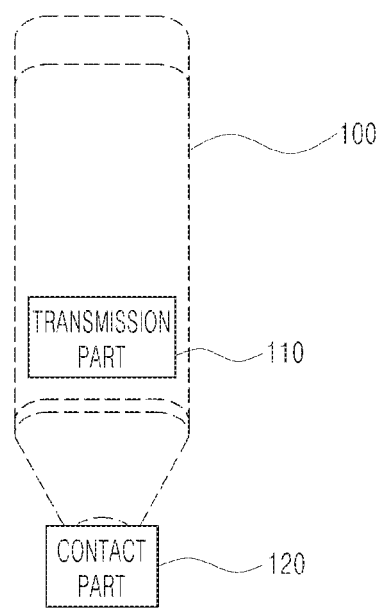
FIG. 2 is a schematic view illustrating the configuration of a stamper according to one embodiment of the present invention.

FIG. 2 is a schematic view illustrating the configuration of the stamper 100 according to one embodiment of the present invention.

Referring to FIG. 2, the stamper 100 according to one embodiment of the present invention includes a transmission part 110 which transmits a beacon signal to the terminal 200, and a contact part 120 having a pattern of contact ports 122 to be recognized by the terminal 200.

The transmission part 110 is provided to irradiate the beacon signal. For example, the transmission part 110 may be a chip antenna capable of irradiating the beacon signal using a BLE (Bluetooth Low Energy) method.

The beacon signal irradiated from the transmission part 110 has a directional beam pattern in which an irradiation angle of the beacon signal is limited to be smaller than a preset irradiation angle.

In order that the beacon signal irradiated from the transmission part 110 has the directional beam pattern, the stamper (100 may further include an irradiation structure 130 to limit the irradiation angle of the beacon signal, as shown in FIG. 3, in addition to the above-described configuration.

The irradiation structure 130 is a shielding structure with its one side opened and is formed to surround the transmission part 110. The beacon signal irradiated from the transmission part 110 is reflected in the inside of the shielding structure. Therefore, the beacon signal irradiated from the transmission part 110 can be transmitted to the terminal 200 through the opened one side of the irradiation structure 130 at a preset irradiation angle.

For reference, some of the beacon signal which is not reflected by the irradiation structure 130 may direct toward the opened one side of the irradiation structure 130 without being reflected by the irradiation structure 130, and the other of the beacon signal flows into a ground.

In the end, the beacon signal irradiated from the transmission part 110 can have the directional beam pattern through the irradiation structure 130 with its one side opened and the irradiation angle of the beacon signal can be greatly limited as compared to that of the existing beacon signal having a non-directional beam pattern.

The stamper 100 including the above-described transmission part 110 and contact part 120 may be entirely or at least partially implemented in the form of hardware or software modules or in combination thereof.

Ultimately, the stamper 100 according to one embodiment of the present invention can achieve stamp saving related to a store for a user through the above configurations. Hereinafter, each of the configurations of the stamper 100 will be described in more detail.

The transmission part 110 performs the function to irradiate a beacon signal.

In more detail, the transmission part 110 uses the beacon signal aimed at the terminal 200 located in a store to transmit store identification information and authentication information to the terminal 200.

At this time, as described above, the transmission part 110 uses the beacon signal irradiated using the BLE (Bluetooth Low Energy) method to transmit the store identification information and authentication information to the terminal 200.

Here, the beacon signal irradiated from the transmission part 110 has the directional beam pattern in which the irradiation angle of the beacon signal is limited to be smaller than the preset irradiation angle by the irradiation structure 130. This is to minimize a possibility that the beacon signal may be received in terminals other than the terminal 200 in which the stamp saving is actually performed, by limiting the irradiation angle of the beacon signal.

On the one hand, as described above, in addition to the store identification information, the authentication information is also contained in the beacon signal irradiated from the transmission part 110. The authentication information may be, e.g., OTP (One Time Password) which can be autonomously generated in the stamper 100 for each time zone.

The reason why the authentication information is transmitted together is to perform an additional authentication procedure in the server 300 based on the authentication information in preparation to terminals other than the terminal 200 in which the stamp saving is actually performed receiving the beacon signal.

The contact part 120 performs the function to cause the pattern of contact ports 121 to be recognized by the terminal 200.

In more detail, the contact part 120 causes the pattern of contact ports 122 contacting the terminal 200 to be recognized by the terminal 200 so that the terminal 200 recognizing the pattern of contact ports 122 can transmit the store identification information and authentication information contained in the beacon signal to the server 300 which then can perform stamp saving related to the store.

At this time, the contact part 120 uses a multi-touch method supported by the terminal 200 to cause the pattern of contact ports 122 to be recognized by the terminal 200. This can be achieved by contacting the contact tip 121 including the contact ports 122 to the screen of the terminal 200.

To this end, the contact part 120 may include the contact tip 121 in which the contact ports 122 contacting the terminal 200 are formed.

Figure 4:
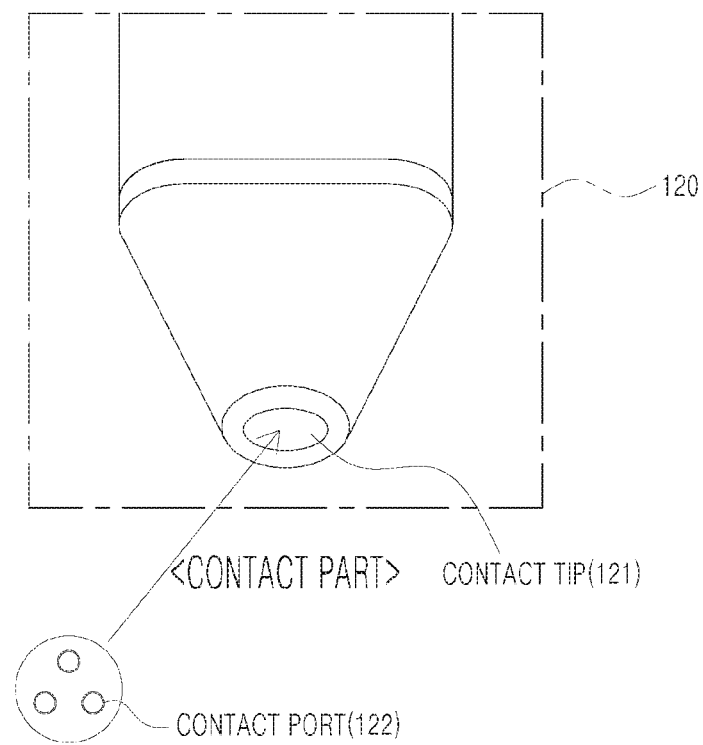

That is, as shown in FIG. 4, a plurality of contact ports 122 is formed in the contact tip 121. When the contact tip 121 contacts the screen of the terminal 200, the terminal 200 can recognize the pattern of contact ports 122 simultaneously contacting the terminal through a multi-touch electrostatic method.

Here, the contact ports 122 may be formed with different numbers, positions and intervals for different stores. This may be utilized as a means for distinguishing one store from another, in addition to the store identification information.

For reference, the interval between the contact ports 122 has to be changed within a preset maximum interval. This is to distinguish a multi-touch by a finger of the user of the terminal 200 from a multi-touch by the stamper 100.

In addition, the contact ports 100 have to be formed on as not to protrude toward the section of the contact tip 121. This is to prevent a protruding pattern from being viewed by naked eyes.

To this end, a structure such as a blind cover for concealing the formed contact ports 122 may be formed in the section of the contact tip 121.

By forming such a structure that the contact ports 122 contact an rear surface against an exposed surface of the blind cover, when the exposed surface of the blind cover is in horizontal contact with the screen of the terminal 200, the terminal 200 can recognize the pattern of contact ports 122 through the multi-touch electrostatic method.

The above-described structure and shape of the contact ports 122 may be determined by the server 300.

That is, when the pattern of contact ports 122 having the structure and shape unique to the store is determined as pattern information by the server 300, the contact part 120 can receive the pattern information from the server 300 and activate at least some of the contact ports 122 formed in the contact tip 121 according to the received pattern information, thereby allowing the terminal 200 to recognize the pattern of the activated contact ports 122.

To this end, the contact part 120 supports the function to change the structure and shape of the contact ports 122 formed in the contact tip 121 in a software (S/W) manner, thereby making it possible to change the hardware structure and shape of the contact ports 122 formed in the contact tip 121 according to the pattern information transmitted from the server 300.

Figure 5:
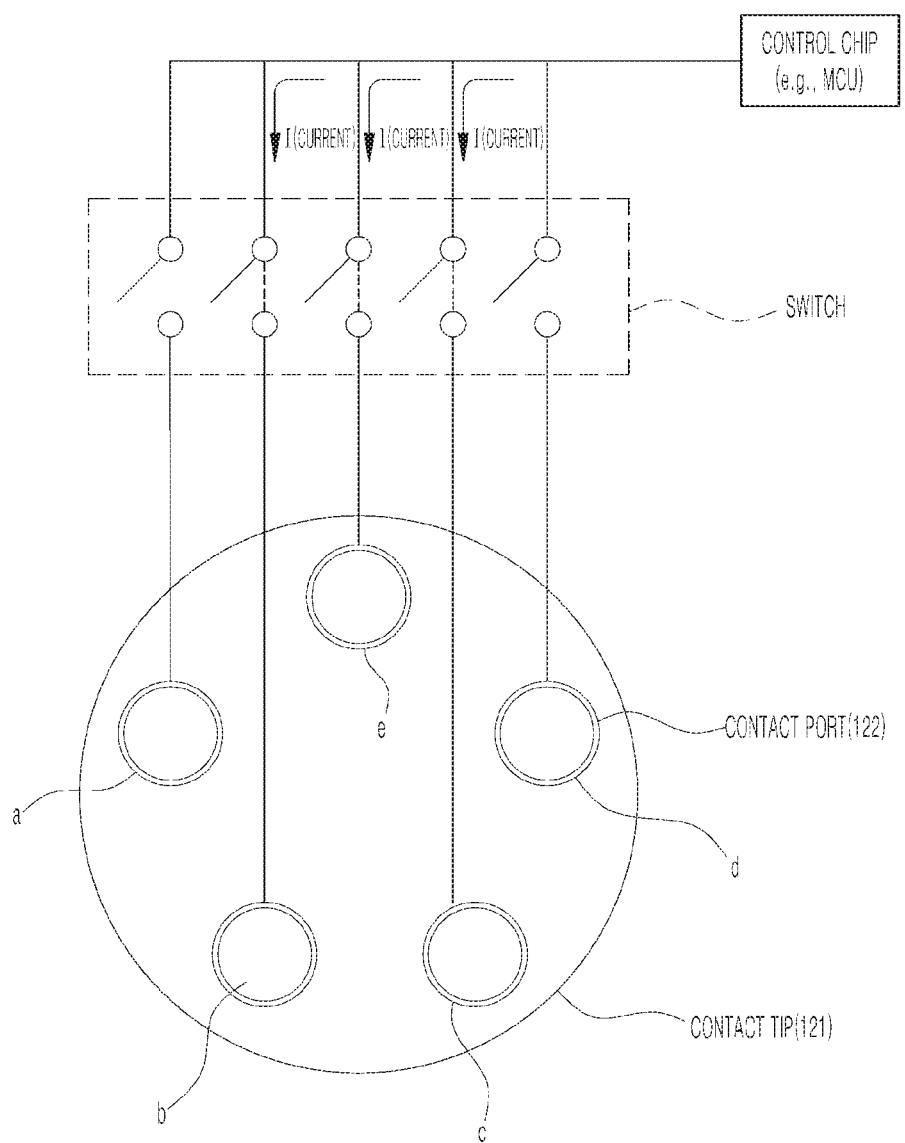

For example, as shown in FIG. 5, the contact part 120 includes five contact ports 122 (*a, b, c, d* and *e*) fixedly formed in the contact tip 121 and may have a hardware structure including a control chip (e.g., MCU) for determining whether to activate each contact port in a switching manner.

For example, when only three (e.g., 122*b*, 122*c* and 122*e*) of the five contact ports 122*a* to 122*e* are to be activated according to the pattern information transmitted from the server 300, the control chip closes only switches connected to the three contact ports 122*b*, 122*c* and 122*e*, thereby allowing a current to be flown into only the three contact ports 122*b*, 122*c* and 122*e* for activation.

It is here to be understood that switches connected to the two remaining contact ports 122*a* and 122*d* are not closed, thereby preventing a current from being flown into the contact ports 122*a* and 122*d* for inactivation.

As a result, when the contact tip 121 contacts the screen of the terminal 200, the terminal 200 can recognize only the three contact ports 122*b*, 122*c* and 122*e* into which the current is flown, through the multi-touch electrostatic method.

This means that the number and shape of contact ports 122 which can be recognized by the terminal 200 are optional depending on switching control performed by the control chip.

In one embodiment of the present invention, stamps can be saved in a way that the contact part 120 contacts the terminal 200 after the transmission part 110 transmits the beacon signal to the terminal 200.

However, without being limited thereto, stamps may be saved in another way that the transmission part 110 transmits the beacon signal to the terminal 200 when it is checked (e.g., ACK/NACK) that the pattern of contact ports 122 is recognized by the terminal 200 after the contact part 120 contacts the terminal 200.

Hereinafter, the configuration of the terminal 200 according to one embodiment of the present invention will be described in more detail with reference to FIG. 6.

Figure 6:
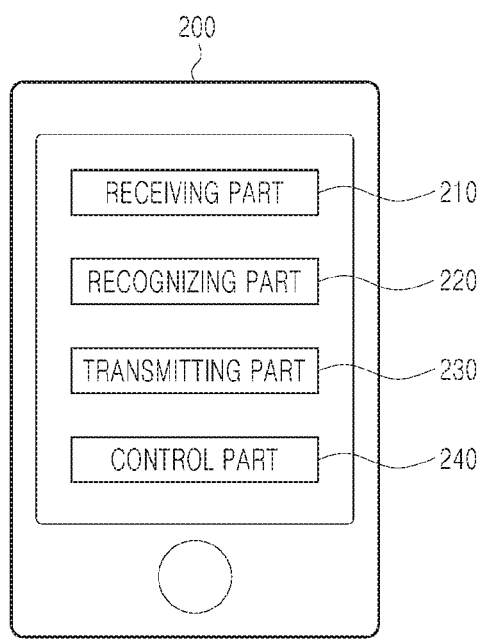
FIG. 6 is a schematic view illustrating the configuration of a. Terminal according to one embodiment of the present invention.

FIG. 6 is a schematic view illustrating the configuration of the terminal 200 according to one embodiment of the present invention.

Referring to FIG. 6, the terminal 200 according to one embodiment of the present invention includes a receiving part 210 which receives the beacon signal containing the store identification information and authentication information from the stamper 100, a recognizing part 220 which recognizes the pattern of contact ports 122 included in the stamper 100, a transmitting part 230 which transmits the store identification information and authentication information to the server 300, and a control part 240 which controls the transmitting part 230 to transmit the store identification information and authentication information received in the receiving part 210 to the server 300 only when the recognizing part 220 recognizes the pattern of contact ports 122 included in the stamper 100.

The terminal 200 including the above-described receiving part 210, recognizing 220, transmitting part 230 and control part 240 may be entirely or at least partially implemented in the form of hardware or software modules executed by an application related to the stamp service, or in combination thereof.

Ultimately, the terminal 200 according to one embodiment of the present invention can achieve stamp saving related to a store for a user through the above configurations. Hereinafter, each of the configurations of the terminal 200 will be described in more detail.

The receiving part 210 performs the function to receive the beacon signal.

In more detail, the receiving part 210 receives the store identification information and authentication information transmitted using the beacon signal from the stamper 100 in the store.

At this time, the receiving part 210 receives the beacon signal irradiated from the stamper 100 using the BLE (Bluetooth Low Energy) method.

Since the beacon signal irradiated from the stamper 100 has a directional beam pattern in which an irradiation angle of the beacon s greatly limited, the beacon signal irradiated from the stamper 100 can be received only in a limited range.

Such receiving the beacon signal irradiated from the stamper 100 only in the limited range is to minimize a possibility that the beacon signal may be received in other terminals in which stamp saving is not substantially performed.

The recognizing part 220 performs the function to recognize the pattern of contact ports 122 included in the stamper 100.

In more detail, upon contacting the contact tip 121 of the stamper 100, the recognizing part 220 recognizes the pattern of contact ports 122 formed in the contact tip 121 through the multi-touch method.

At this time, the recognizing part 220 recognizes a pattern of activated contact ports 122 of the entire contact ports 122 formed in the contact tip 121 of the stamper 100.

The control unit 240 performs the function to achieve the stamp saving.

In more detail, when the recognizing part 220 recognizes the pattern of contact ports 122, the control part 240 controls the transmitting part 230 to transmit the store identification information and authentication information, which are received by the receiving part 210 from the stamper 100, to the server 300 in which the stamp saving is achieved.

At this time, the control part 240 checks whether or not identification information of a saving card being executed in an application matches the store identification information transmitted from the stamper 100 and whether or not the recognized pattern of contact ports 122 matches pattern information received from the server 300. Thereafter, only when it is checked that both match with each other, the control part 240 can transmit the store identification information and authentication information to the server 300.

Here, the check on whether or not the recognized pattern of contact ports 122 matches the pattern information received from the server 300 may be made by checking whether or not the number, position and interval of the recognized contact ports 122 match the pattern information at all.

At this time, the number and position of contact ports 122 may be used to distinguish one store from another and the interval of the contact ports 122 may be used to distinguish a touch by a finger of the user from a touch by the stamper 100.

As described above, according to the stamp service system according to one embodiment of the present invention, in performing the stamp saving related to a store for a user by utilizing an electronic stamp and an application installed in a terminal, by limiting an irradiation angle of the beacon signal irradiated from the stamper 100 and additionally applying the authentication information, it is possible to prevent malicious and illegal use of stamps even when the beacon signal is received in terminals other than the terminal 200 in which the stamp saving is performed.

Hereinafter, a stamp service method according to one embodiment of the present invention will be described with reference to FIGS. 7 and 8.

For the convenience of description, the elements shown in FIGS. 1 and 6 will be described by referring to the corresponding reference numerals.

Figure 7:
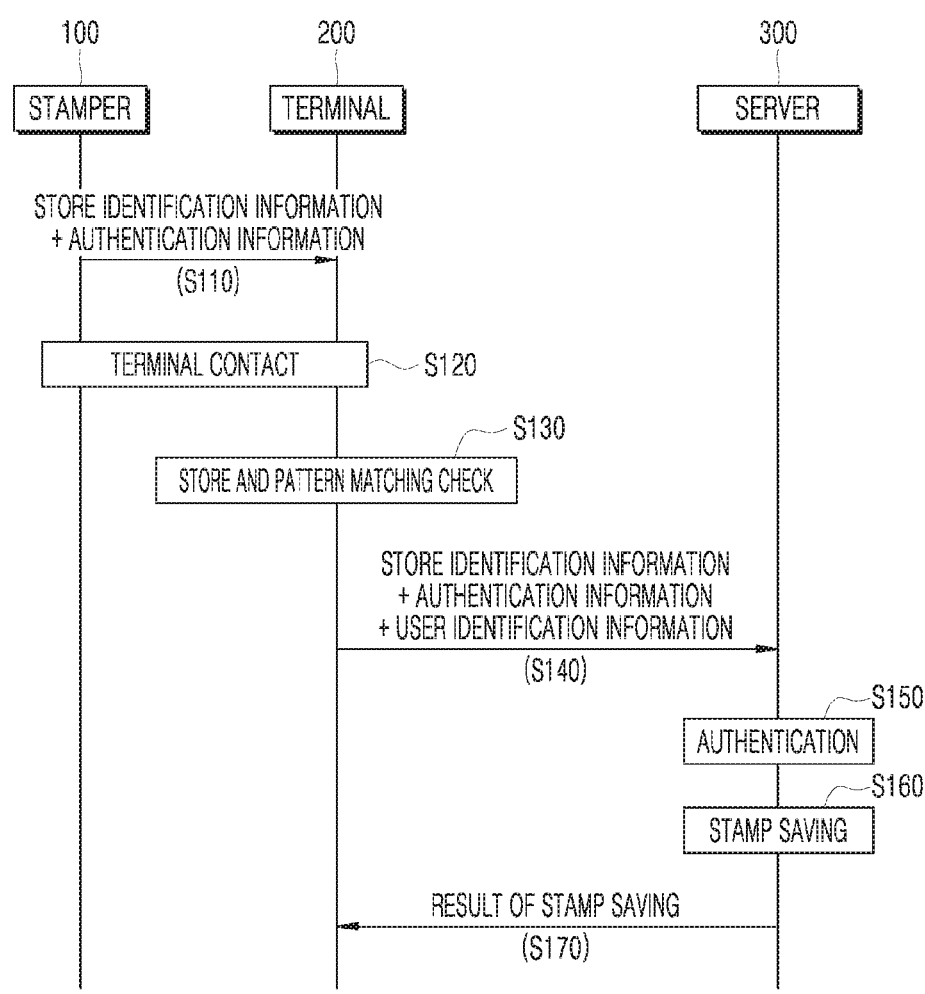
FIG. 7 is a schematic sequence for explaining a flow of operation in the stamp service system according to one embodiment of the present invention.
Figure 8:
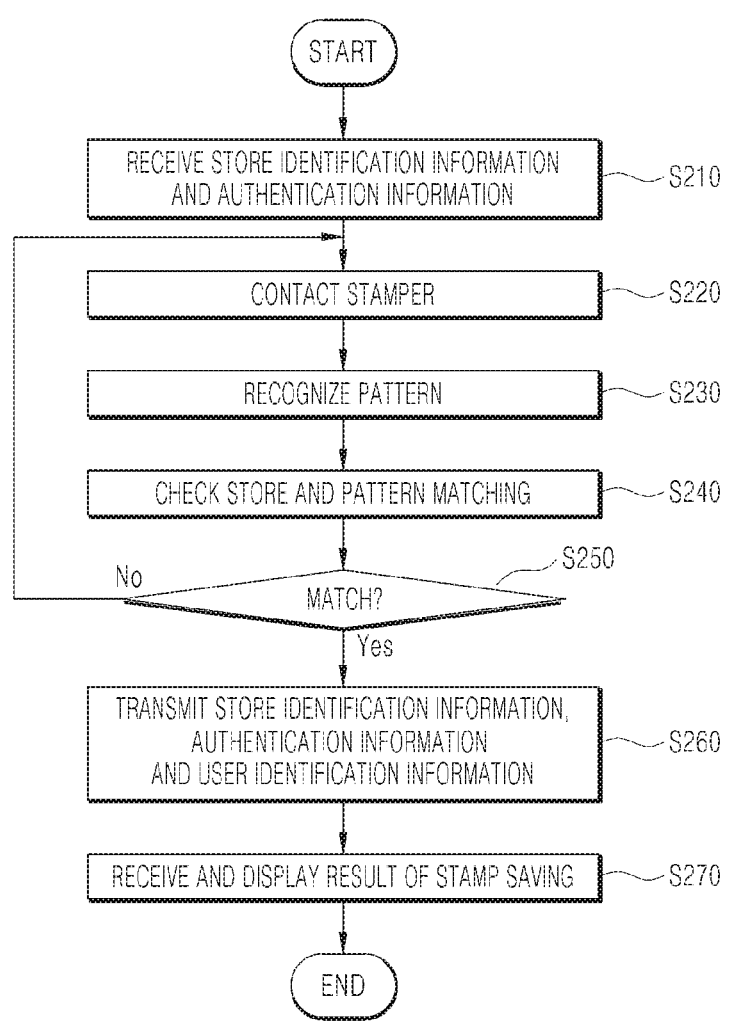
FIG. 8 is a flow chart for explaining a flow of operation in the terminal according to one embodiment of the present invention.

FIG. 7 is a schematic sequence for explaining a flow of operation in the stamp service system according to one embodiment of the present invention.

Referring to FIG. 7, first, the stamper 100 uses a beacon signal aimed at a terminal 200 located in a store to deliver store identification information and authentication information to the terminal 200 (S110).

At this time, the stamper 100 irradiates the beacon signal having a directional beam pattern in which an irradiation angle of the beacon signal is limited to be smaller than a preset irradiation angle. This is to minimize a possibility that the beacon signal is received in terminals other than the terminal 200 in which stamping saving is actually performed, by limiting the irradiation angle of the beacon signal.

Then, the stamper 100 causes a pattern of contact ports 122 contacting the terminal 200 to be recognized by the terminal 200 so that the terminal 200 recognizing the pattern of contact ports 122 can deliver the store identification information and authentication information contained in the beacon signal to the server 300 which then can perform stamp saving related to the store (S120).

At this time, the stamper 100 uses a multi-touch method supported by the terminal 200 to cause the pattern of contact ports 122 to be recognized by the terminal 200. This can be achieved by contacting the contact tip 121 including the contact ports 122 to the screen of the terminal 200.

Then, the terminal 200 recognizes the pattern of contact ports 122 from the contact tip 121 of the stamper 100 contacting the screen of the terminal 200. Upon recognizing the pattern of contact ports 122, the terminal 200 delivers the store identification information and authentication information received from the stamper 100 to the server 300 in which the stamp saving is performed (S130 and S140).

At this time, the terminal 200 checks whether or not identification information of a saving card being executed in an application matches the store identification information delivered from the stamper 100 and whether or not the recognized pattern of contact ports 122 matches preset pattern information. Thereafter, only when it is checked that both match with each other, the terminal 200 can transmit the store identification information and authentication information to the server 300.

Further, upon receiving the store identification information and authentication information, along with a stamp saving request, from the terminal 200, the server 300 performs an authentication procedure required for stamp saving (S150).

At this time, the server 300 can perform the authentication procedure by checking the store in which the stamp saving is achieved, based on the store identification information, and checking whether or not the authentication information delivered along with the store identification information matches authentication information issued in the store.

To this end, the server 300 separately manages authentication information generated in the store every time zone. Thus, upon receiving the authentication information from the terminal 200, the server 300 can check whether or not the received authentication information matches the separately managed authentication information.

Thereafter, the server 300 saves stamps related to the store for the user (S160 and S170).

At this time, in saving the stamps, the server 300 may additionally receive user identification information from the terminal 200, in addition to the above-mentioned store identification information and authentication information. Upon receiving the user identification information, the server 300 identifies a user for which stamp saving is requested, based on the user identification information, and then performs stamp saving related to the store for the user.

Here, a result of the stamp saving performed in the server 300 is returned from the server 300 to the terminal 200 in which the result of the stamp saving can be displayed on the screen of the terminal 200.

Hereinafter, the operation of the terminal 200 according to one embodiment of the present invention will be described in detail with reference to FIG. 8.

First, the receiving part 210 receives the store identification information and authentication information transmitted using the beacon signal from the stamper 100 in the store (S210).

At this time, the receiving part 210 receives the beacon signal irradiated from the stamper 100 using the BLE (Bluetooth Low Energy) method.

Since the beacon signal irradiated from the stamper 100 has a directional beam pattern in which an irradiation angle of the beacon signal is greatly limited, the beacon signal irradiated from the stamper 100 can be received only in a limited range.

Such receiving the beacon signal irradiated from the stamper 100 only in the limited range is to minimize a possibility that the beacon signal may be received in other terminals in which stamp saving is not substantially performed.

Then, upon contacting the contact tip 121 of the stamper 100, the recognizing part 220 recognizes the pattern of contact ports 122 formed in the contact tip 121 through the multi-touch method (S220 and S230).

At this time, the recognizing part 220 recognizes a pattern of activated contact ports 122 of the entire contact ports 122 formed in the contact tip 121 of the stamper 100.

Thereafter, when the recognizing part 220 recognizes the pattern of contact ports 122, the control part 240 controls the transmitting part 230 to transmit the store identification information and authentication information, which are received by the receiving part 210 from the stamper 100, to the server 300 in which the stamp saving is achieved (S240 to S260).

Here, the check on whether or not the recognized pattern of contact ports 122 matches the pattern information received from the server 300 may be made by checking whether or not the number, position and interval of the recognized contact ports 122 match the pattern information at all.

At this time, the number and position of contact ports 122 may be used to distinguish one store from another and the interval of the contact ports 122 may be used to distinguish a touch by a finger of the user from a touch by the stamper 100.

In the end, when it is checked that the identification information of a saving card being executed in an application matches the store identification information delivered from the stamper 100 and that the pattern of contact ports of the stamper 100 matches the preset pattern information, the control part 240 controls the transmitting part 230 to transmit the store identification information and authentication information, which are received by the receiving part 210 from the stamper 100, to the server 300 in which the stamp saving is achieved.

Further, when a result of the performed stamp saying is received from the server 300, the control part 240 displays the received result of the stamp saving on an application execution screen (S270).

As described above, according to the stamp service system according to one embodiment of the present invention, in performing the stamp saving related to a store for a user by utilizing an electronic stamp and an application installed in a terminal, by limiting an irradiation angle of the beacon signal irradiated from the stamper 100 and additionally applying the authentication information, it is possible to prevent malicious and illegal use of stamps even when the beacon signal is received in terminals other than the terminal 200 in which the stamp saving is performed.

The steps of the method or algorithm described in connection with the embodiments suggested herein may be directly implemented by hardware or may be implemented in the form of program instructions executed through a variety of computing means and recorded in a computer-readable recording medium. The computer-readable recording medium may store program instructions, data files, data structures and so on alone or in combination. The program instructions stored in the medium may be ones specially designed and configured to implement the present invention or ones known in the art of computer software. Examples of the computer-readable recording medium may include magnetic media such as a hard disk, a floppy disk and a magnetic tape, optical media such as CD-ROM and DVD, magneto-optical media such as a floptical disk, and hardware devices specially configured to store and execute program instructions, such as ROM, RAM, flash memory and so on. Examples of the computer programs may include machine language codes created by a compiler and high level language code executed by a computer using an interpreter or the like. The hardware devices may be configured to be operated as one or more software modules to perform the operation of the present invention and vice versa.

While the present invention has been particularly shown and described with reference to exemplary embodiments thereof, it will be understood by those skilled in the art that various changes in form and details may be made therein without departing from the spirit and scope of the present invention as defined by the appended claims and equivalents thereof. Therefore, the disclosed embodiments have to be construed as not limitative but illustrative. The accompanying claims and their equivalents are intended to cover such forms or modifications as would fall within the scope and spirit of the disclosures.

What is claimed is:

1. A stamper comprising:
a transmission part configured to transmit a beacon signal containing authentication information and store identification information required for stamp saving to a terminal;
a plurality of contact ports contacting the terminal;
a contact part configured to provide a pattern of the contact ports with the terminal when the contact ports contact the terminal; and
an irradiation structure formed to shield the transmission part, and having one side opened and the other sides closed, such that the beacon signal, which is transmitted from the transmission part, is irradiated to the terminal through the opened one side of the irradiation structure at a preset irradiation angle.

2. The stamper according to claim 1, wherein the stamp pattern of the contact ports is set by activating at least one of contact ports according to preset pattern information.

3. The stamper according to claim 2, wherein the preset pattern information is transmitted from a server.

4. The stamper according to claim 1, wherein the irradiation structure is a shielding structure with one side opened and is formed to surround the transmission part in such a manner that the beacon signal irradiated from the transmission part is transmitted to the terminal through the opened one side at the preset irradiation angle.

5. The stamper according to claim 1, wherein the transmission part transmits the beacon signal containing store identification information in addition to the authentication information to the terminal.

6. A method for operating a terminal, comprising:
receiving, from a stamper having a plurality of contact ports and an irradiation structure, an irradiated beacon signal containing authentication information and store identification information required for stamp;
recognizing a pattern of the contact ports included in the stamper when the contact ports are contacted; and
transmitting the authentication information to a server for stamp saving when the pattern of the contact ports matches preset pattern information,
wherein the irradiated beacon signal is received through an opened one side of the irradiation structure at a preset irradiation angle.

7. The method according to claim 6, wherein the step of receiving the irradiated beacon signal comprises receiving the irradiated beacon signal containing store identification information in addition to the authentication information from the stamper.

* * * * *